May 25, 1954 H. D. ROOP 2,679,317
INSPECTING METHOD AND APPARATUS
Filed Oct. 25, 1946 5 Sheets-Sheet 2

INVENTOR:
HAROLD D. ROOP
BY HIS ATTORNEYS
HARRIS, KIECH, FOSTER & HARRIS

May 25, 1954 H. D. ROOP 2,679,317
INSPECTING METHOD AND APPARATUS
Filed Oct. 25, 1946 5 Sheets-Sheet 4

INVENTOR:
HAROLD D. ROOP
BY HIS ATTORNEYS
HARRIS, KIECH, FOSTER & HARRIS

Patented May 25, 1954

2,679,317

UNITED STATES PATENT OFFICE 2,679,317

INSPECTING METHOD AND APPARATUS

Harold D. Roop, Los Angeles, Calif., assignor to Automatic X-Ray Corp., Los Angeles, Calif., a corporation of California Application October 25, 1946, Serial No. 705,695

21 Claims. (Cl. 209—111)

My invention relates in general to methods of and apparatus for inspecting or testing objects for the purpose of evaluating various characteristics or properties thereof, and a primary objective of the invention is to provide a method and apparatus of this general nature which involve utilizing the results of the inspection of an object as the basis for performing an operation or sequence of operations on the object subsequent to the inspection thereof.

The fundamental principles of my invention may be embodied in methods of and apparatus for performing a variety of operations in connection with objects of various types, and such operations may be performed with reference to the values of various pertinent characteristics or properties of the objects as determined by inspection or testing thereof. For example, the inspection of a particular object may, in accordance with my invention, involve measuring the dimensions of the object, or may involve evaluating such properties thereof as its weight, color, the condition or state of its internal or external structure, its moisture content, its electrical resistance or magnetic permeability, its X-ray opacity, etc.

The results of the inspection of the object with regard to any of the foregoing or various other properties thereof may be derived in various manners and may be employed as a reference in performing various operations on the object. For example, the value of a given property of the object may be employed to control the duration of a process or treatment wherein the relationship between the value of the aforesaid property of the object and the duration of the process or treatment may be critical. The evaluation of a given property of the object may also be employed as a reference to which a subsequent evaluation of the same property may be compared after an intervening process or treatment to which the object may be subjected so that small changes in the value of the aforesaid property of the object resulting from the process or treatment may be determined readily and accurately.

As another example, the results of the inspection of a plurality of similar objects having some property in common, may in accordance with my invention, be employed as the basis for grading or classifying the objects according to the value of the common property thereof. The grading operation may take the form of an actual physical sorting of the objects into various grades or classifications, or may take the form of marking or otherwise identifying each object so as to correlate the objects and their respective classifications.

The fundamental principles of my invention are particularly applicable to a method and apparatus of the foregoing general character whereby objects having some representative characteristic in common may be inspected to evaluate this characteristic thereof and may subsequently be graded or classified according to the value of the aforesaid characteristic, and I prefer to consider such an application of the fundamental principles involved for convenience in disclosing the invention.

It will be understood, however, that since my invention is susceptible to a variety of applications as heretofore indicated, I do not desire to be limited to the various applications suggested heretofore, nor to the specific application which I have elected to consider herein for convenience in disclosing the invention. The specific application considered hereinafter involves all of the fundamental principles of my invention and thus will enable those skilled in the art to apply these principles in other fields.

In general, one of the principal objectives of my invention is to provide a method of and apparatus for inspecting an object wherein the result of the inspection is recorded at the time the object is inspected, and wherein the record thus obtained is subsequently employed as a reference in performing a desired operation on the object at some convenient time subsequent to the inspection thereof.

A related objective of my invention is to provide an inspecting method and apparatus of the foregoing character which involve moving the object from the point or station at which the inspection is made to a processing point or station where the desired operation may conveniently be performed on the object. The result of the inspection may be recorded temporarily at a point which is spaced from the object, and the record thus provided is preferably moved from the inspection station to the processing station concurrently with the object so that if a sequence of objects is being inspected, the various objects and the respective records of the results of the inspections thereof may be correlated, which is another objective of my invention.

By recording the result of the inspection of the object in accordance with the foregoing objectives of my invention, the desired operation or operations may be performed on the object at any convenient time and place. Thus, the desired operation may be performed at a processing station which is spaced from the inspection station a distance sufficient to avoid concentrating all of the apparatus required for inspecting and processing the object in a restricted area, which is an important feature of my invention and which represents a distinct advantage over prior apparatus.

Another objective of my invention is to provide fully automatic apparatus which is adapted to inspect an object, temporarily record the results of the inspection, move the object and the record to a processing station, and then perform the desired operation or operations on the object in accordance with the results of the inspection as indicated by the record thereof.

An important objective of my invention is to provide apparatus of the character described wherein the record of the results of the inspection of an object is adapted to actuate suitable means for performing the desired operation on the object.

In the particular field of application which I have elected to consider herein, it is an important objective of my invention to provide apparatus which automatically inspects objects to evaluate a common characteristic thereof, and which automatically sorts the objects into two or more grades or classifications according to the values of the aforesaid common characteristic.

Still another objective of my invention is to provide apparatus of the character described for grading objects which inspects the objects at an inspection station, temporarily records the results of the inspection, moves the objects and the records corresponding thereto to a processing station, and subsequently sorts the objects into a plurality of grades according to the information provided by the records of the inspection of the objects. A related objective is to provide grading apparatus of this character wherein the records of the results of the inspection of the objects automatically actuate means for sorting the objects into the proper grades.

A further objective of my invention is to provide grading apparatus of the foregoing character which includes conveyor means for moving the objects in sequence from an inspection station to a processing zone or station, and which includes means actuable by the aforesaid records for removing the objects from the conveyor means as each of the objects reaches a predetermined point in said processing zone which corresponds to the grade or classification thereof. In a grading device constructed in accordance with the foregoing objectives of my invention, the apparatus for inspecting the objects and the apparatus for removing the objects from the conveyor means may be spaced apart a distance sufficient to avoid concentrating the various components involved in an undesirably small area. Such a construction simplifies the design and manufacture of the grinding apparatus and permits of easier inspection and maintenance thereof, which are important features of the invention.

In the specific embodiment of my invention which is disclosed hereinafter, it is an important objective to provide means for ejecting the objects from the conveyor at a relatively high rate of speed as the objects reach points in the processing zone which correspond to the respective classifications thereof. Another objective of my invention in this connection is the provision of means for catapulting the objects from the conveyor including a plurality of catapults which are mounted on the conveyor and each of which is adapted to carry one of the objects through the inspection station to the processing station. Still another objective in this connection is to provide devices for operating the catapults which are also mounted on the conveyor and which may be actuated by the records corresponding to the objects that are to be ejected from the conveyor.

Catapulting the objects from the conveyor at relatively high rates of speed in accordance with the foregoing objectives of my invention materially reduces the distances which the objects travel in the direction of motion of the conveyor during the ejecting operations, and, as a result, the objects may be ejected into chutes, for example, which are substantially smaller than would otherwise be required. Catapulting the objects from the conveyor in the manner described is considerably more accurate than ejecting the objects by means of devices located beside the conveyor since, among others, the latter suffer from the disadvantage of being required to work on a moving object. Since the catapults are mounted on the conveyor, the objects are uniformly accelerated from rest relative to the conveyor during the ejecting operation and therefore are not likely to be damaged during ejection, whereas ejecting devices located beside the conveyor must strike the objects with such force, in order to be effective, that damage thereto is very likely to occur.

In the particular field of application of my invention which I have elected to consider herein, it is still another objective to provide apparatus for inspecting an object which evaluates a property thereof of unknown value by comparing the object to another, standard object having a similar property of known value. More specifically, an objective of my invention in this connection is to provide apparatus which is adapted to evaluate any difference between the desired property of the object being inspected and the corresponding property of the standard object.

Still another important objective of my invention is to provide a grading device which automatically inspects and subsequently sorts objects according to the state or condition of the internal structures thereof. In the particular embodiment of my invention, which is disclosed hereinafter, it is an objective to provide grading apparatus which evaluates the condition of the internal structures of objects by means of X-rays and which subsequently sorts the objects into a plurality of grades in accordance with the conditions of the internal structures thereof.

Another objective of my invention is to provide apparatus of the foregoing character which simultaneously X-rays a standard object and an unknown or test object, and which automatically evaluates any difference between the X-ray opacities of the objects and assigns a classification to the test object in accordance with the magnitude of such difference. Apparatus which is adapted to inspect an object automatically in accordance with the foregoing objective of my invention produces a more accurate evaluation of the condition of the internal structure of the object and evaluates the internal condition thereof far more rapidly than is possible with the apparatus in common use heretofore.

Although X-rays have been used extensively in industrial inspection for a considerable length of time, the use thereof has to date been confined almost entirely to radiography and fluoroscopy, both of which involve the exercise of the judgment of a skilled operator who must compare X-ray images of a test and standard object and must not only mentally determine whether any difference exists, but in some cases must attempt to evaluate the difference if several possible classifications for the test object exist. Automatic X-ray inspection and comparison of the test and standard objects eliminate the foregoing and various other disadvantages of radiography and fluoroscopy since no images are required, nor, and more important, is any exercise of human judgment involved.

Automatic X-ray inspection involves the use of a pair of X-ray sensitive devices one of which is adapted to intercept and evaluate the intensity of an X-ray beam which is transmitted through the test object, and the other of which is adapted to intercept and evaluate the intensity of a similar X-ray beam which is transmitted through the standard object. In an automatic X-ray inspection system of the character contemplated herein, the intensities of the transmitted X-ray beams are automatically compared and any difference in the conditions of the internal structures of the test and standard objects is thus automatically evaluated, thereby eliminating any necessity for human intervention. Automatic X-ray inspection systems incorporating X-ray sensitive devices of various types may be employed in accordance with my invention, a suitable automatic X-ray inspection system being disclosed in my copending application Serial No. 623,335, filed October 19, 1945, and entitled "Balanced Circuits for Determining the Intensity of Ionizing Radiation," and such an inspection system, per se, forms no part of the present invention.

Although the specific embodiment of my invention which I have elected to consider herein may be employed for inspecting and grading various objects according to the state or condition of the internal structure thereof, provided that variations in the internal structure of the objects are of such a nature as to increase or decrease the X-ray opacity thereof, it is particularly adapted for and has been designed primarily for the purpose of inspecting and grading such products as oranges according to the juice content thereof. Consequently, for convenience in disclosing the invention, I prefer to consider such an application of the embodiment which is described hereinafter.

The juice content of an orange is one of the principal indications of its quality, and is, therefore, a measure of its value to the consumer, particularly if the orange is purchased solely for the sake of the juice which can be extracted therefrom. In any large group of apparently perfect oranges of a given size, considerable variations in the juice content of the individual oranges may be encountered, and some of the oranges in the group may be found to have a negligible juice content and should be considered rejectable.

Grading oranges according to juice content, as well as according to size, coloring, skin texture, etc., is desirable not only in so far as the consumer is concerned, but is also desirable from the grower's standpoint. Sorting the oranges into several grades according to juice content assures the consumer of uniform quality, and increases the returns to the grower if a large percentage of the oranges have a high juice content since such oranges can be sold at a higher price than oranges having a low juice content. It will be apparent, however, that in order to be practicable on a commercial scale, it is imperative that the oranges be graded according to juice content without adding materially to the cost of the product, an objective which my invention proposes to attain and which has not been attained heretofore.

In applying the fundamental principles of my invention to the art of grading oranges according to the juice content thereof, I utilize the fact that variations in the X-ray opacity of oranges of a given size are primarily a function of variations in the juice content thereof, the juice content of a given orange being approximately directly proportional to the X-ray opacity thereof. Factors other than juice content and size affect the X-ray opacity of oranges somewhat, but to such a slight extent as compared to the effect of variations in the juice content and size that these factors may be ignored without detracting from the accuracy of the grading process. The effect of size variations may be disposed of readily by grading oranges according to juice content which have previously been graded according to size, the latter being an operation which is conventional practice.

The various objectives and advantages of my invention which have been discussed heretofore, together with others which will be evident hereinafter, may be realized by means of the exemplary embodiment of my invention which is illustrated in the accompanying drawings and which is described in detail hereinafter. Referring to the drawings, which are intended as illustrative only.

Figure 1:
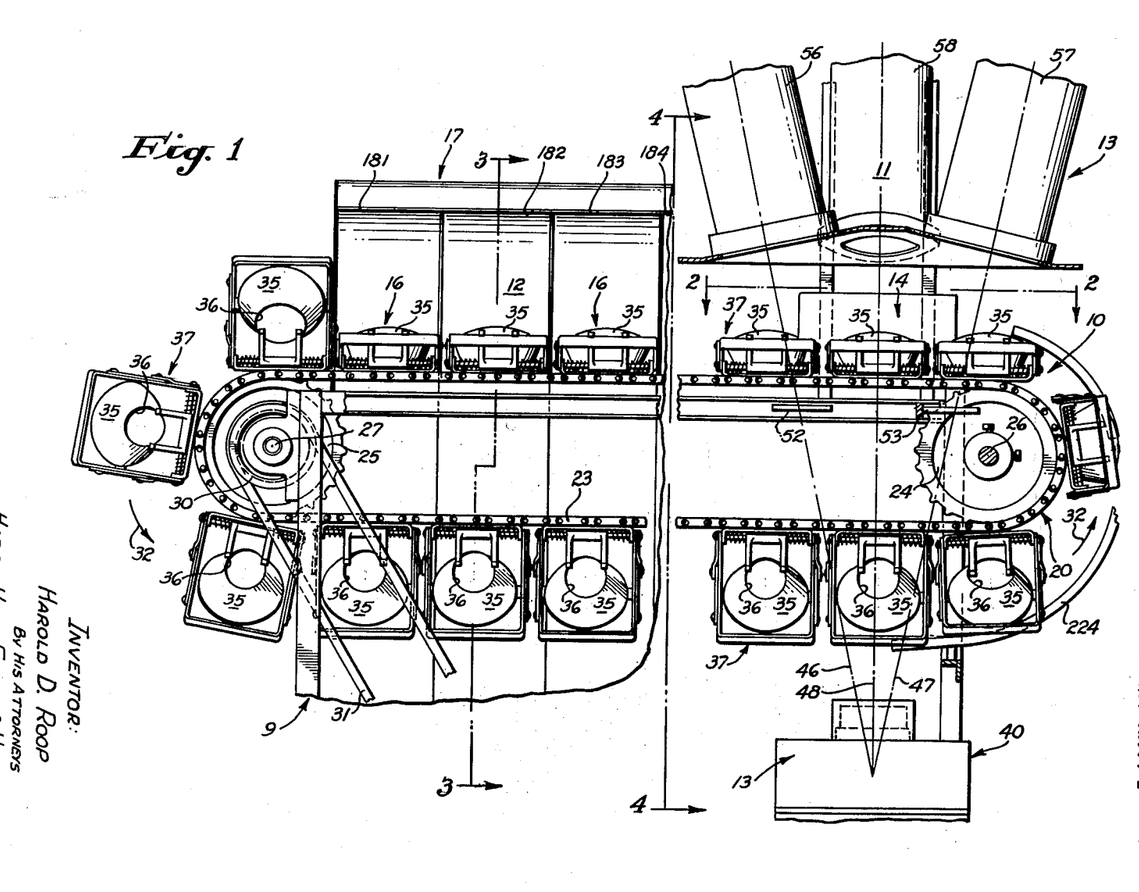
Fig. 1 is a side elevational view of apparatus for inspecting and grading objects which embodies the fundamental principles of my invention.
Figure 2:
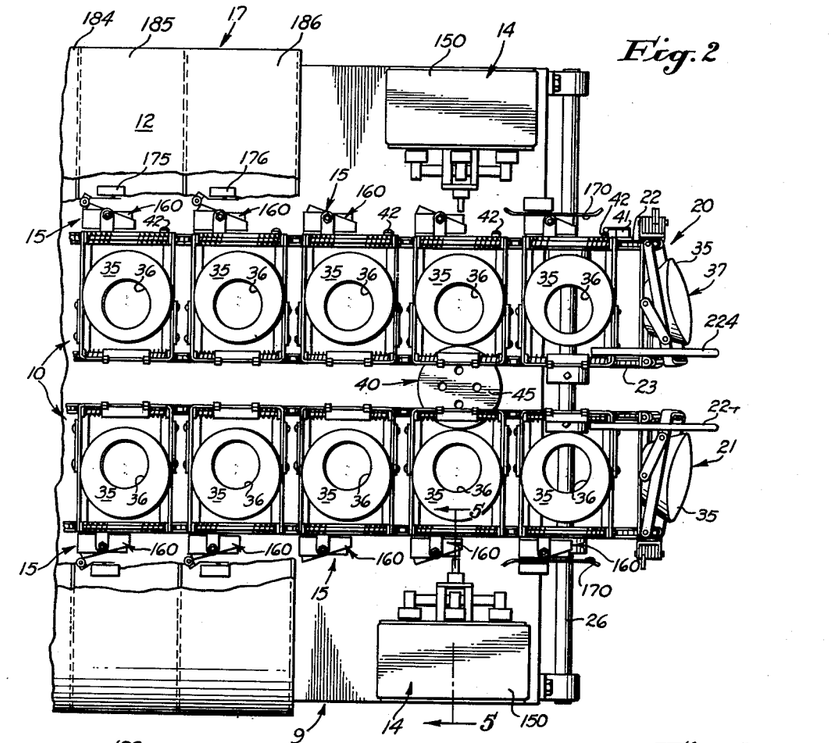
Fig. 2 is a fragmentary plan view of the inspecting and grading apparataus which is taken as indicated by the arrows 2—2 of Fig. 1.

Referring to the drawings and particularly to Figs. 1 and 2 thereof, the exemplary embodiment of my invention that I have elected to consider herein includes a chassis 9 on which is mounted conveyor means 10 for moving oranges or other objects in sequence from an inspecting station or zone, indicated generally at 11, to a processing station or zone which is indicated generally by the numeral 12. The apparatus includes means indicated generally at 13 for inspecting each orange as it moves through the inspecting station 11 to evaluate some characteristic or property which is representative of the quality thereof, which characteristic or property is the juice content thereof in the particular embodiment under consideration. More specifically, the inspecting means 13 is adapted to determine the state or condition of the internal structure of each orange by evaluating its X-ray opacity since, as previously discussed, the condition of the internal structure of an orange as indicated by its X-ray opacity is indicative of its juice content.

The inspecting means 13 is adapted to actuate means indicated generally by the numeral 14 for recording the result of the inspection of each orange or other object by providing a temporary record 15 thereof at a point spaced from the orange, the oranges and the records corresponding thereto being movable concurrently from the inspecting station 11 to the processing station 12 in such a manner as to maintain a proper correlation between the oranges and the respective records as will be discussed in more detail hereinafter. The records 15 are adapted to actuate processing means indicated generally at 16 for performing a predetermined operation on each orange at the processing station 12, which operation involves sorting the oranges according to the previously determined juice content thereof in the particular construction illustrated. As will be discussed in more detail hereinafter, the processing means 16 is preferably adapted to sort the oranges by catapulting them from the conveyor means 10 into one of a group 17 of chutes or the like which correspond to various values of juice content.

Considering the apparatus in more detail, the conveyor means 10, in the particular construction illustrated, includes a pair of spaced, parallel conveyors 20 and 21 each of which is adapted to move a sequence of oranges or other objects from the inspecting station 11 to the processing station 12. However, any desired number of the conveyors 20 and 21 may be employed, the number two having been selected for the reason that the inspecting means 13 may conveniently be employed to inspect two sequences of oranges simultaneously as will be discussed in more detail hereinafter. The conveyors 20 and 21 are of similar construction so that only the former will be considered in detail to avoid unnecessary duplication.

As best shown in Figs. 1 and 2, the conveyor 20 includes a pair of spaced, parallel, endless chains 22 and 23, or the like, which extend between the inspecting station 11 and the processing station 12, and each of which is trained over a sprocket 24 adjacent the inspecting station and over a sprocket 25 adjacent the processing station. The sprockets 24 are mounted on a shaft 26, and the sprockets 25 are mounted on and suitably secured to a similar shaft 27, the shafts being supported by suitable bearings which are mounted on the chassis 9 in a manner not specifically shown but well known in the art. A pulley 30 or the like is mounted on and suitably secured to the shaft 27 and may be driven by any suitable source of power, such as an electric motor (not shown), through a belt 31 or the like to drive the conveyors 20 and 21. It will be apparent that by driving the conveyors 20 and 21 in the direction of the arrows 32, all portions of the conveyors move along continuous paths from the inspecting station 11 to the processing station 12 and then back to the inspecting station, and thus each of the conveyors may be employed to move a sequence of oranges from the inspecting station to the processing station.

Figure 3:
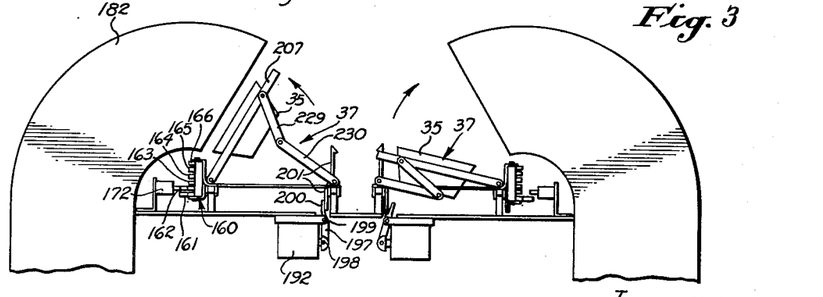
Fig. 3 is an enlarged, fragmentary sectional view which is taken along the broken line 3—3 of Fig. 1.

Each orange or other object is preferably carried in one of a plurality of generally frustoconical or funnel-shaped receptacles or cups 35 each of which is provided with a central opening 36 at the smaller end thereof through which an X-ray beam may pass as will be discussed in more detail hereinafter. Each of the cups 35 is mounted on a supporting framework 37 which spans the chains 22 and 23 forming the conveyor 20 and is suitably secured thereto. In the particular construction illustrated, the frameworks 37 supporting the receptacles 35 are catapults which are movable transversely of the conveyor 20 in a manner to be described in more detail hereinafter so as to eject each orange into the proper chute 17 in accordance with the juice content thereof. In catapulting the oranges from the conveyor 20 into the chutes 17 at the processing station 12, the catapults 37 move from an operative position to an inoperative position, as best shown in Figs. 3 and 4, and remain in the inoperative position during movement thereof from the processing station toward the inspecting station 11 until they approach the inspecting station, as will be discussed in more detail hereinafter.

In the particular construction illustrated, the inspecting means 13 includes an X-ray generator 40 which is preferably mounted on the chassis 9 beneath and between the conveyors 20 and 21, as best shown in Fig. 1, so that an X-ray beam generated thereby may be employed for inspecting an orange on each of the conveyors simultaneously as will be discussed in more detail hereinafter. The X-ray generator 40, which is conventional in all respects and is, therefore, not considered in detail herein, is preferably energized only when a pair of oranges on the conveyors 20 and 21 is to be inspected at the inspecting station 11, and is preferably inoperative in the intervals during which a pair of oranges which has just been inspected is being moved away from the inspecting station by the conveyors and the next pair is being moved toward the inspecting station. In order to achieve such intermittent operation, the X-ray generator 40 is provided with a suitable switch 41, shown schematically in Fig. 8, which is adapted to close the X-ray generator circuit when or just before each pair of oranges enters the inspecting station 11, and which is adapted to open the circuit just after each pair of oranges leaves the inspecting station. As best shown in Fig. 2, the switch 41 is mounted on the chassis 9 beside the conveyor 20 and may be actuated by suitable projections 42 on the conveyor which are so located and spaced as to close the switch and permit it to open at the times specified.

Figure 4:
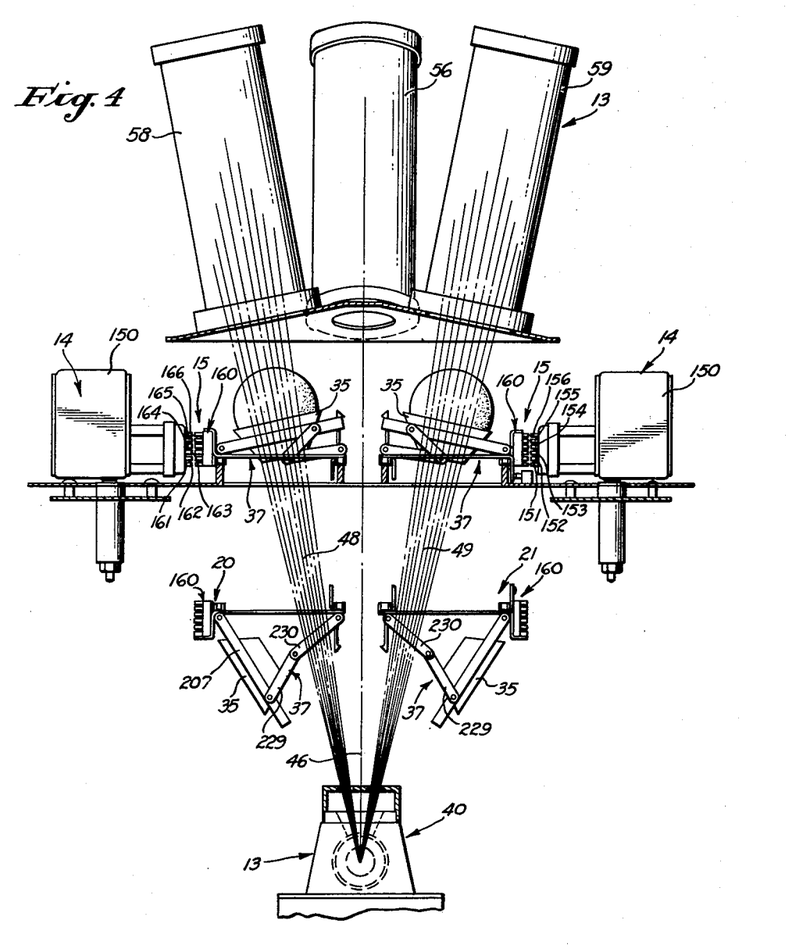
Fig. 4 is an enlarged, semi-diagrammatic sectional view which illustrates the operation of a portion of the apparatus for inspecting the objects and which is taken as indicated by the arrows 4—4 of Fig. 1.

The X-ray generator 40 preferably includes a collimating plate 45 which as shown in Fig. 2, is provided with four openings therein so as to split the X-ray beam produced by the generator into four separate beams or beam segments, two of which, 46 and 47, preferably lie in a plane substantially parallel to the direction of motion of the conveyors 20 and 21, as best shown in Fig. 1, and the other two of which, 48 and 49, preferably lie in a plane substantially perpendicular to the direction of motion of the conveyors as best shown in Figure 4. As will be discussed in more detail hereinafter, the beams 46 and 48 are employed in inspecting the oranges carried by the conveyor 20 and the beams 47 and 49 are employed in inspecting the oranges carried by the other conveyor 21. The collimating plate 45 permits all of the beams or beam segments 46 to 49 to be derived from a single X-ray tube (not shown) so that the intensities of all of the beam segments will be equal. The use of the collimating plate 45 in combination with a single X-ray tube thus eliminates any necessity for compensating for differences in intensity which may result from the use of individual X-ray tubes for each of the beam segments 46 to 49, which is another feature of my invention.

The beams 46 and 47 are directed through "standard" objects 52 and 53, as best shown in Fig. 1, and may conveniently be termed "standard" beams, each of the standard objects having an X-ray opacity which is equal to that of an orange of specified size and having a specified juice content. The specified juice content upon which the X-ray opacities of the standard objects 52 and 53 are based may be any desired value, although I prefer to employ some average value of juice content for convenience. The standard objects 52 and 53 need and preferably have no physical similarity to the objects being inspected and may be formed of any suitable material such as sheets of aluminum or Bakelite, for example.

The X-ray opacity of such a standard object is unchanging, unlike that of an average specimen of the objects being inspected. The standard objects 52 and 53 may occupy positions in the standard beams 46 and 47 such as are shown in Fig. 1, and, if desired, may be replaced with other standard objects having different X-ray opacities if it is necessary to change the standard for any reason, as when inspecting oranges of different sizes.

As best shown in Fig. 4, the beams or beam segments 48 and 49 are directed through oranges on the conveyors 20 and 21, respectively, and may conveniently be termed "test" beams, the receptacles 35 in which the oranges to be inspected are carried being so inclined when the catapults 37 are in their operative positions, i. e., the positions of the uppermost catapults as viewed in Fig. 4, that the test beams are directed through the central openings 36 in the receptacles and the centers of the test beams coincide with the axes of the receptacles. It will be noted that when the catapults 37 are in their inoperative positions, i. e., the positions occupied by the lowermost catapults as viewed in Fig. 4, the receptacles 35 mounted on the inoperative catapults do not obstruct the test beams 48 and 49. The relatively open framework forming the catapults 37 and the spaced chains 22 and 23 forming the conveyors 20 and 21 provide an interstitial construction which includes sufficient open space to provide clear paths for the test beams 48 and 49 at the instant the oranges in the receptacles on the operative catapults thereabove are being inspected. The interstitial nature of the conveyors 20 and 21 and the catapults 37 thus permits locating the X-ray generator beneath and between the conveyors in the manner illustrated to provide a simple and compact inspecting apparatus, which is an important feature of my invention.

In the particular construction illustrated, the inspecting means 13 also includes four X-ray sensitive devices 56, 57, 58 and 59 which intercept those portions of the X-ray beams 46, 47, 48 and 49, respectively, that have passed through the test and standard objects. The devices 56 and 57 are adapted to evaluate the intensities of those portions of the standard beams 46 and 47 which are transmitted through the standard objects 52 and 53, respectively, and hence, may conveniently be termed "standard" X-ray sensitive devices. The devices 58 and 59 are adapted to evaluate the intensities of those portions of the test beams 48 and 49 which are transmitted through a pair of oranges being inspected, and may be termed "test" X-ray sensitive devices.

Various X-ray sensitive devices are available which may be incorporated in the inspecting means 13. Such devices fall into two general classifications, one of which employs a light-sensitive cell in combination with a fluorescent screen, and the other of which utilizes the principle that X-rays are capable of ionizing a gas and causing it to become conducting in proportion to the intensity of the radiation. I prefer to employ devices of the latter classification since the photo cell-fluorescent screen combination is subject to fatigue and drift and is incapable of integrating an X-ray beam larger than the active area of the cell, which is ordinarily relatively small, without using an optical system. On the other hand, devices employing the ionizing properties of X-rays are not subject to fatigue or drift and are capable of integrating relatively large beams without any optical system.

An X-ray sensitive device which utilizes the ionizing ability of the radiation may be termed an ionization chamber or cell and may be of any size or shape consistent with the requirements of the apparatus in which it is incorporated. Basically, such an ionization chamber includes two insulated electrodes or electrode systems across which a steady source of potential is applied. When an X-ray beam traverses a gas disposed between the electrodes, the gas becomes conducting to an extent which is determined by the intensity of the beam, the conductivity of the gas, which may be measured with any suitable instrument in the electrode circuit, being directly proportional to the intensity of the beam throughout a very wide range. Although various forms of such an ionization chamber may be employed for the X-ray sensitive devices 56, 57, 58 and 59, the form shown in my co-pending application, Serial No. 623,334, filed October 19, 1945, and entitled "Improved Ionization Chamber and Method," may be employed, if desired. Since the structure and operation of such an ionization chamber are fully discussed in my aforesaid co-pending application, a further discussion thereof herein is unnecessary.

Figure 8:
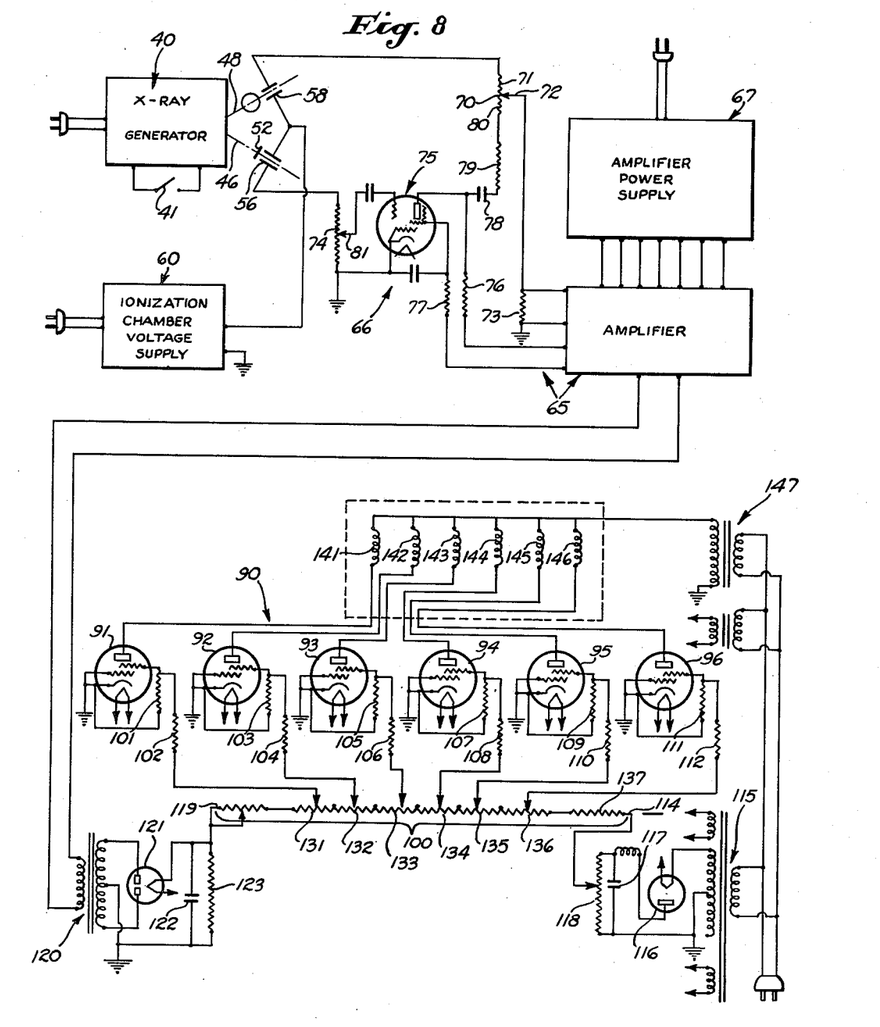
Fig. 8 is a diagrammatic view illustrating the various circuits incorporated in the inspecting and grading apparatus.

In Fig. 8 I show schematically that portion of the inspecting means 13 which is adapted to inspect the oranges carried by the conveyor 20, that portion of the inspecting means which is associated with the conveyor 21 being similar in all respects. The standard and test X-ray sensitive devices or ionization chambers 56 and 58 are shown schematically as simple condensers between the electrodes of which the standard and test beams 46 and 48, respectively, are directed, the standard object 52 being disposed in the standard beam 46 between the X-ray generator 40 and the standard ionization chamber 56, and the orange to be inspected being disposed in the test beam 48 between the X-ray generator and the test ionization chamber 58. The voltage supply unit for the ionization chambers 56 and 58 is indicated at 60 and, since it is of conventional construction, will not be considered in detail.

The ionization chambers 56 and 58 are connected so as to constitute the arms of a bridge circuit so that the ionization current flowing in one chamber is constantly compared with that flowing in the other. Thus, if the X-ray opacity of the orange being inspected is the same as that of the standard object 52, i. e., if the juice content of the orange is equal to the specified value, then radiation of the same intensity will be intercepted by the test chamber 56 and the standard chamber 58 so that the currents flowing in the chambers are equal, and, as a result, the bridge circuit will be in balance. However, if the X-ray opacity, i. e., juice content, of the orange being inspected differs from that of the standard object 52, the bridge circuit will be unbalanced in proportion to the difference in X-ray opacities. The resulting unbalanced output is preferably amplified and, in the particular construction illustrated, is subsequently employed to actuate the means 14 for recording the juice content of the orange being inspected.

As indicated in Fig. 8, the outputs of the ionization chambers 56 and 58 are connected to an amplifier indicated generally at 65 and having an input circuit 66 which includes means for inverting the phase of the output of one of the ionization chambers so that it may be opposed to the output of the other. Except for the input circuit 66, the amplifier 65 is of conventional construction and will not be described in detail. The amplifier 65 is connected to an amplifier power supply unit 67 in the usual manner.

Considering the input circuit 66 of the amplifier 65, as the outputs of the ionization chambers 56 and 58 enter the input circuit, both are in phase, i. e., at any instant the outputs of the two chambers are of the same polarity. The test chamber 58 is connected to a variable-resistor 70 in such a manner that the output thereof flows through a portion 71 of the resistor to a movable contact 72 which is grounded through a resistor 73 in the grid circuit of the first amplifier tube (not shown). The standard chamber 56 is grounded through a variable resistor 74 in the grid circuit of a phase inversion tube 75, the latter being energized through a plate resistor 76 and screen resistor 77 by a suitable source (not shown) of B voltage. Since a signal applied to the grid of the phase inversion tube 75 appears at the plate thereof displaced 180 degrees by virtue of the characteristic action of the tube, the output of the standard ionization chamber 56 is thus displaced 180 degrees by the tube 75 and then flows through a condenser 78, a resistor 79, a portion 80 of the resistor 70, flows to the movable contact 72, and then to ground through the grid resistor 73.

The outputs of the ionization chambers 56 and 58 have a common path through the grid resistor 73 and, since the action of the phase inverting tube 75 has placed them in opposition, at any instant they are of opposite polarity. If the outputs of the two chambers 56 and 58 are also of equal amplitude, which is the case when the X-ray opacities of the orange being inspected and of the standard object 52 are equal, no current flows through the grid resistor 73 and thus no signal is applied to the grid of the first amplifier tube. If, however, the output of one of the ionization chambers 56 or 58 exceeds that of the other, the difference is amplified, thus causing a change in the output voltage of the amplifier 65 which, in the particular embodiment of my invention considered herein, may be utilized to actuate the means 14 for recording the juice content of the orange being inspected as will be discussed in more detail hereinafter.

The amplifier 65 requires only a few simple controls, one of these being the movable contact 72 for varying the relative resistances offered by the portions 71 and 80 of the resistor 70. The contact 72 thus acts as a phase shifter with reference to the opposed signals from the ionization chambers 56 and 58 and may be adjusted to insure that the signals from the two chambers are properly superimposed. The resistor 74 is provided with an adjustable contact 81 which permits control of the strength of the signal applied to the grid of the phase inverting tube 75 so that this signal, when amplified by the tube 75, will be equal to the unamplified signal from the test ionization chamber 58. The amplifier 65 is also preferably provided with the usual gain control (not shown) to permit varying the degree of amplification.

It will be apparent that if the bridge circuit in which the ionization chambers 56 and 58 are connected were normally balanced when the X-ray opacity of the orange being inspected equals that of the standard object 52, the input to the amplifier 65 would, under such normal conditions, be equal to zero. Consequently, any variations in the output of the test chamber 58, whether due to increases or decreases in the X-ray opacities of the oranges being inspected relative to the X-ray opacity of the standard object 52, would always result in an increase in the output voltage of the amplifier 65. In order that variations in the output voltage of the amplifier 65 may be employed to indicate either an increase or a decrease in the X-ray opacity of the orange being inspected with respect to the standard opacity, a predetermined amount of unbalance is introduced into the bridge circuit in which the ionization chambers 56 and 58 are connected when the X-ray opacities of the orange and the standard object 52 are equal so that, under such normal conditions, the input to the amplifier 65 and, consequently, the output voltage of the amplifier will be some normal value which is other than zero. Thus, differences in the X-ray opacities of the oranges being inspected from the standard opacity produce either increases or decreases in the output voltage of the amplifier with respect to the aforesaid normal value thereof.

The desired unbalance may be introduced into the bridge circuit in which the chambers 56 and 58 are connected by adjusting the variable resistor 74, the degree and direction of the unbalance being determined by the requirements of the objects being inspected and of the inspecting and grading apparatus. In the particular construction under consideration herein, the direction of the unbalance is preferably such that when an orange which is deficient in juice content is being inspected, the output voltage of the amplifier 65 increases, and, conversely, is preferably such that when an orange having a juice content in excess of the specified value is inspected, the result will be a decrease in the output voltage of the amplifier from the normal value. The degree of unbalance must, of course, be such that oranges having very high juice contents will not cause the output voltage of the amplifier 65 to fall to zero. The reasons for selecting such a direction for the unbalance in the bridge circuit will become apparent in the following paragraphs.

It will be apparent from the foregoing that the components of the inspecting and grading apparatus thus far described move the orange or other object to the point of inspection, inspect the orange, compare it to a standard, and indicate the result at the output terminals of the amplifier 65 in the form of an output voltage which is inversely proportional to the juice content of the orange. The amplifier output voltages corresponding to the juice contents of the oranges under inspection are subsequently utilized to determine the proper classification of each orange as to juice content according to a predetermined scale, and to record the classifications of the oranges temporarily in the form of the records 15 for subsequent use in sorting the oranges into the various classifications as will be described in more detail hereinafter.

That portion of the inspecting means 13 which determines the proper classification of each orange according to juice content on the basis of the voltage at the output terminals of the amplifier 65 is indicated generally by the numeral 90 in Fig. 8, and, in the particular construction illustrated, includes a thyratron network which is adapted to actuate the recording means 14 in a manner to be described in more detail hereinafter. The thyratron network includes a plurality of thyratron tubes, one being required for each grade or classification into which the oranges are to be sorted. In the particular form illustrated, six tubes, indicated by the numerals 91 to 96, respectively, are employed to provide six possible grades according to juice content, each grade embracing oranges having juice contents that fall within a predetermined range. The thyratron tubes 91 to 96 are adapted to fire at different amplifier output voltages, which, as previously discussed, are proportional to different values of juice content, and thus determine in which of the six possible grades each orange belongs. The tubes 91 to 96, in firing, actuate the means 14 for recording the grade of each orange on the records 15 in a manner about to be described.

Considering the thyratron network in detail, the control grids of the thyratron tubes 91 to 96 are connected to a resistor 100 through grid and decoupling resistors 101 to 112, inclusive, in a manner which will be apparent from Fig. 8. A fixed negative bias is applied to one end 114 of the resistor 100 by a rectifier-filter network which includes a transformer 115, a tube 116, a condensor 117 and a variable resistor 118, the amplitude of the bias voltage being controlled by means of the variable resistor 118. The fixed negative bias applied to the end 114 of the resistor 100 in this manner normally prevents firing of the thyratron tubes 91 to 96 until sufficient positive voltage is applied to the other end 119 thereof to offset the negative bias as will be discussed in more detail hereinafter.

The output terminals of the amplifier 65 are connected to the primary winding of a transformer 120, the secondary winding thereof being connected to a rectifier-filter network which includes a tube 121, a condenser 122 and a resistor 123, and which applies a positive voltage to the end 119 of the resistor 100 in proportion to the output voltage of the amplifier, and, consequently, in proportion to the juice content of the orange being inspected. This positive voltage applied to the end 119 of the resistor 100 offsets the fixed negative bias applied to the opposite end 114 thereof to an extent such that the thyratron tube corresponding to the grade of the orange being inspected will fire as will be described in the following paragraphs.

The resistor 100 includes six individual, variable resistors 131 to 136, inclusive, to which the control grids of the thyratron tubes 91 to 96, respectively, are connected, and includes a fixed resistor 137 at the end 114 thereof. If the total resistance of the resistors 131 to 136 is approximately equal to that of the fixed resistor 137 and if a fixed negative bias is applied to the end 114 of the resistor 100 as hereinbefore discussed, it will be apparent that, in the absence of any output by the amplifier 65, all of the control grids of the thyratron tubes 91 to 96 are negative and all of the tubes are therefore non-conducting.

However, if the amplifier output is equal to some value other than zero, a positive voltage will be applied to the end 119 of the resistor 100 and offsets the negative bias applied to the opposite end 114 to a certain extent so that for any given value of the applied positive voltage, the net voltage will be zero at some point on the resistor 100. This zero point will, of course, shift toward the negative end 114 of the resistor 100 as the voltage applied to the positive end 119 thereof increases. Thus, at any instant there will be a positive voltage gradient which increases in value toward the left of the zero point, as viewed in Fig. 8, and there will be a negative gradient which increases toward the right of the zero point. Since the thyratron tubes 91 to 96 preferably fire when the bias is very slightly positive, it will be apparent that each tube will fire as the point of zero bias reaches or moves slightly to the right of the points at which the control grids of the respective tubes are connected to the resistor 100. Thus, as the output of the amplifier 65 increases from zero to a maximum value, the thyratron tubes 91 to 96 will fire in numerical order.

As previously discussed, the bridge circuit in which the ionization chambers 56 and 58 are connected is preferably so adjusted that when the X-ray opacity of the orange being inspected is equal to that of the standard object 52, the output of the amplifier 65 is equal to a predetermined value which decreases in proportion to increases in juice content, or, conversely, which increases in proportion to the juice deficiency of the orange undergoing inspection. Thus, an orange of high juice content produces a small amplifier output so that the point of zero bias will be near the positive end 119 of the resistor 100, whereas an orange of low juice content produces an amplifier output such that the point of zero bias will be near the negative end 114 of the resistor.

The variable resistor 131 in the control grid circuit of the thyratron tube 91 is so adjusted that this tube will always fire whenever a small positive voltage, corresponding to an orange of high juice content, is applied at the positive end 119 of the resistor 100. The variable resistor 132 is so adjusted that the next tube, 92, will also fire when a larger positive voltage, corresponding to an orange of somewhat lower juice content, is applied. The adjustment of the resistor 132 is such that if the juice content of the orange undergoing inspection is greater than the minimum required for top grade, e. g., grade I, oranges, only the tube 91 will fire, whereas if the juice content thereof is less than the minimum required for grade I oranges but greater than the minimum for grade II oranges, both the tube 91 and the tube 92 will fire. Similarly, the variable resistors 133, 134, 135 and 136 are so adjusted that if the orange being inspected is classifiable in grades III, IV, V, or VI, tubes 91 through 93, 91 through 94, 91 through 95, or 91 through 96 will fire. Thus, the number of the thyratron tubes 91 to 96 which are energized corresponds to the grade number of the orange undergoing inspection.

The thyratron tubes 91 to 96, when energized in the manner described, may be employed for actuating any suitable means 14 for providing the records 15 of the grades or classifications of the oranges undergoing inspection. The recording or record providing means 14 may, for example, take the form of apparatus for perforating a tape of paper or other material to record the grade of each orange, or may take the form of apparatus for magnetizing a metallic tape to produce the records 15. The records may also be produced on mechanical recording devices and in the particular embodiment of my invention which is considered herein, the recording means 14 preferably includes such mechanical devices, these being actuable by a system of solenoids which are energized by the thyratron tubes 91 to 96 as will be discussed in detail in the following paragraphs.

The thyratron tubes are connected in parallel circuits which include solenoids 141 to 146, respectively, and which have a common source of power in the secondary winding of a power transformer 147 as shown in Fig. 8. The thyratrons 91 to 96 thus act as electronic relays which, when energized in the manner previously described, complete the circuits to the solenoids 141 to 146, respectively. The solenoids form part of the recording means 14 and, when energized by the thyratron tubes, are adapted to provide the records 15 of the juice content of the oranges being inspected as will be described in detail hereinafter.

Figure 5:
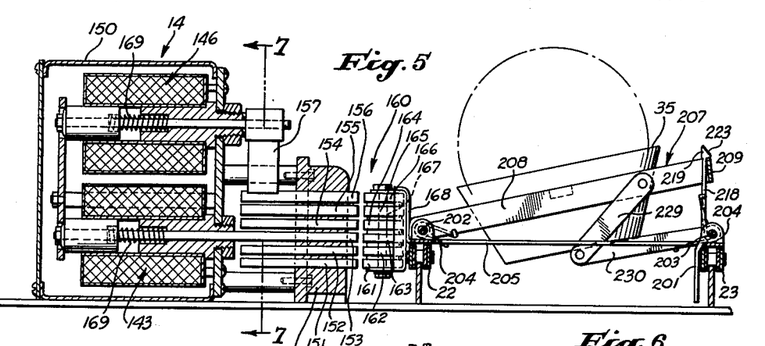
Fig. 5 is an enlarged, fragmentary sectional view of a portion of the apparatus for grading the objects and is taken as indicated by the arrows 5—5 of Fig. 2.
Figure 6:
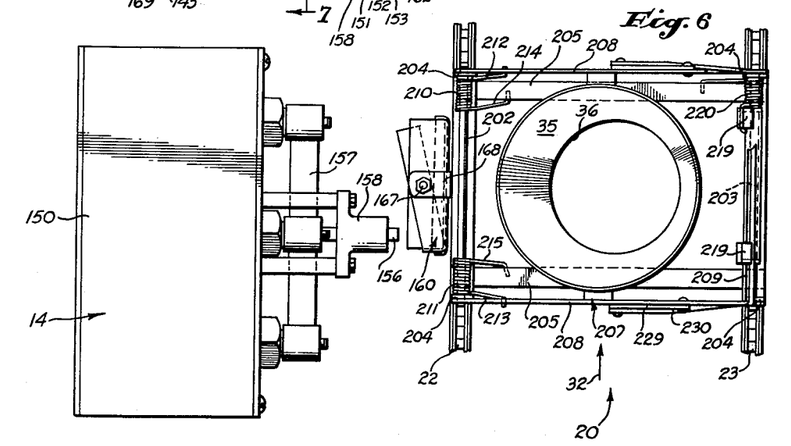
Fig. 6 is a plan view of the portion of the grading apparatus which is illustrated in Fig. 5.
Figure 7:
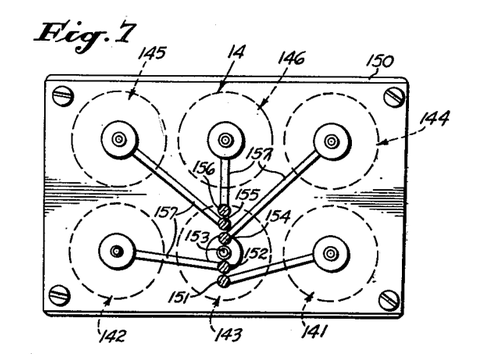
Fig. 7 is a sectional view which is taken along the broken line 7—7 of Fig. 5.

As shown generally in Fig. 2 and in detail in Figs. 5 to 7, the solenoids 141 to 146 are mounted in a housing 150 which is mounted on the chassis 9 beside the conveyor 20, a similar solenoid system being located beside the conveyor 21. The armatures of the solenoids 141 to 146 are connected to plungers 151 to 156, respectively, by suitable arms 157 in such a manner that all of the plungers are disposed in a single plane which is vertical in the particular construction illustrated. The plungers 151 to 156 are movable longitudinally in openings in a guide member 158 which supports the plungers as best shown in Fig. 5.

Referring particularly to Fig. 2, the recording means 14 includes a plurality of recording devices 160 each of which is mounted on the conveyor 20 opposite one of the receptacles 35 for the oranges which are being inspected and graded, and is actuable by the plungers 151 to 156 as will be described hereinafter. As best shown in Figs. 5 and 6, each of the recording devices 160 includes a stack of bars 161 to 166 corresponding in number to the number of grades into which the oranges have been classified, which is six in the particular construction illustrated. The bars 161 to 166 of each recording device 160 are mounted on a vertical shaft 167 which preferably extends through the approximate midpoint of each bar, the shaft being carried by a bifurcated bracket 168 which is mounted on the chain 22 forming part of the conveyor 20. The bars 161 to 166 are rotatable independently of each other about the shaft 167 through a limited range, and are so located that they are aligned with the plungers 151 to 156, respectively, when the recording device 160 is opposite the plungers.

The components of the inspecting and grading apparatus which have been described thus far are adapted to determine the grade in which each orange belongs according to its juice content, and are adapted to actuate that recording device 160 which is located opposite the receptacle 35 carrying the orange in question so as to record the grade in which it has been classified. At the instant that a particular orange has been moved into the inspecting station 11 by the conveyor 20 (or the conveyor 21), the trailing portions or halves of the bars 161 to 166 of the recording device 160 corersponding to that orange are aligned with the plungers 151 to 156, respectively, as best shown in Fig. 6, the direction of motion of the conveyor being indicated by the arrow 32. When the orange has been inspected and the proper grade assigned thereto in accordance with its juice content as previously discussed, one or more of the solenoids 141 to 146, depending upon the grade of the orange, are energized by the corresponding thyratron tubes so that one or more of the corresponding plungers 151 to 156 are extended. The plungers which are extended in this manner strike the trailing halves of the corresponding bars 161, etc. of the recording device opposite the orange being inspected so that the leading portions or halves of these bars are rotated outwardly as shown in Fig. 6, thereby recording the grade of the orange being inspected. The plungers which have been extended are subsequently retracted by suitable springs 169 which are incorporated in the various solenoids in the conventioal manner as best shown in Fig. 5.

Thus, if the juice content of the particular orange being inspected is such that it is classifiable in grade I, only the thyratron tube 91 will fire, thereby energizing the solenoid 141 so that the plunger 151 strikes the trailing half of the bar 161 of the corresponding recording device 160 to rotate the leading half of the bar 161 outwardly, thereby recording the fact that the orange has been classified in grade I. Similarly, if the orange is classifiable in one of the remaining grades, the leading halves of a corresponding number of the bars 161 to 166 will be rotated outwardly to record the grade of the orange. Thus, if the orange belongs in grade VI, the leading halves of all six of the bars 161 to 166 will be rotated outwardly to record that fact.

As will be discussed in detail in the following paragraph, the number of projecting bars on each of the recording devices 160 determines the point in the processing station or zone 12 at which the corresponding orange will be ejected from the conveyor, the projecting bars being adapted to actuate the catapults 37 at the proper points. Subsequently, the projecting bars on each recording device 160 are restored to their inoperative positions at some point along the path of the conveyor 20 between the processing station 12 and the inspecting station 11. As shown in Fig. 2, the projecting bars may be returned to their inoperative positions by a plate 170 which engages the leading edges of the bars and rotates them about the shaft 167 into their inoperative positions as the recording device approaches the inspecting station 11.

The leading portion of each of those bars (161, etc.) of each recording device 160 which has been acted upon by the corresponding plunger (151, etc.) in the manner described is adapted to close one of a series of spring type switches each of which is adapted to actuate the catapult 37 opposite which the particular recording device is located, as will be discussed in more detail hereinafter, so that the catapult will discharge the orange carried in the receptacle 35 thereon from the conveyor 20. The number of switches employed corresponds to the number of bars incorporated in each recording device 160 and thus corresponds to the number of grades into which the oranges are to be sorted, which is six in the particular construction under consideration.

The six switches referred to in the preceding paragraph are mounted on the chassis 9 beside the conveyor 20 and are spaced throughout the processing station 12 along the path of the conveyor, the position of each switch corresponding to the point at which an orange of a particular grade is to be catapulted from the conveyor. The switches are also distributed throughout the processing station 12 at elevations such that each will intercept and be closed by a particular bar (161, etc.) of each recording device 160 only if the leading portion of that bar has been extended by the corresponding plunger (151, etc.) to record the grade of the corresponding orange in the manner described.

Referring to Fig. 2, the first of the switches encountered by each of the recording devices 160 (i. e., the switch in the processing station 12 which is nearest the inspecting station 11) is indicated by the numeral 176 and is so located that it can be closed only by the bar 166 and only when the leading portion of this bar has previously been extended by the plunger 156, which indicates that the orange in the receptacle 35 opposite which the particular recording device is located has a juice content such that it has been classified in grade VI. The switch 176, when closed by the bar 166 in this manner, is adapted to actuate the catapult 37 on which the receptacle 35 carrying the grade VI orange is mounted so that the catapult ejects the orange into a chute 186 for grade VI oranges as will be described in more detail hereinafter.

If a given orange has been classified in grade V, only the bars 161 to 165, inclusive, of the corresponding recording device 160 will have been extended so that the bar 166 thereof will not close the switch 176. The conveyor 20 thus moves the grade V orange past the chute 186 for grade VI oranges to a point opposite a chute 185 for grade V oranges. At this point, the recording device 160 opposite the grade V orange encounters a switch 175 which is so located that it can be closed by the bar 165 if it is extended, which indicates that the orange has been classified in grade V. The switch 175 then actuates the catapult 37 on which the receptacle 35 carrying the grade V orange is mounted so as to discharge the orange into the proper chute 185.

In a similar manner each of the four remaining bars 164, 163, 162 and 161 of each recording device 160 is adapted to close that one of the four remaining switches (not shown in Fig. 2) which corresponds thereto, provided, of course, that the particular bar has previously been extended by the plunger corresponding thereto. Thus, if the bars 161 to 164, inclusive, are extended, which indicates a grade IV orange, the bar 164 closes the switch corresponding thereto to catapult the orange into a chute 184 for grade IV oranges. Similarly, the bars 163, 162 and 161 are adapted to close the respective switches corresponding thereto when the corresponding oranges are opposite chutes 183, 182 and 181, respectively, for grade III, grade II and grade I oranges, respectively.

Thus, oranges which are deficient in juice content and have been classified in grade VI are discharged from the conveyor 20 and into the chute 186 at the end of the processing station 12 which is nearest the inspecting station 11, and oranges which have been classified in grade I because of their high juice content are discharged into the chute 181 at the opposite end of the processing station, oranges of intermediate grades, i. e., grades V, IV, III and II, being discharged into the chutes 185, 184, 183 and 182, respectively, in the order listed at points intermediate the ends of the processing station.

The manner in which the switches 176, 175, etc., actuate the catapults 37 when closed by the bars 166, 165, etc., respectively, may best be considered in connection with the left-hand section of Fig. 3 wherein I show one of the catapults in the process of discharging an orange into the chute 182 for grade II oranges. It will be noted that the bars 161 and 162 of the particular recording device 160 shown are extended since the orange being discharged is a grade II orange, the bar 162 having closed the switch corresponding thereto, which is indicated by the numeral 172, so as to actuate the catapult 37, the construction of which will be described in detail hereinafter.

The switch 172 is connected to a solenoid 192 in a manner not specifically shown and is adapted to energize the solenoid when closed by the bar 162 of the recording device 160. The armature of the solenoid is pivotally connected to one end of a lever 197 as indicated at 198, the lever being pivotally mounted at 199 and being provided with an arm 200 which is adapted to engage and release a trigger 201. The trigger forms part of each catapult 37 and is adapted to actuate the catapult as will be described in more detail hereinafter. The relative positions of the trigger 201 and the arm 200 of the lever 197 are such that the trigger is directly opposite the arm at the instant that the switch 172 is closed by the bar 162, whereupon the catapult discharges the orange into the chute 182. The remaining switches, when closed by the bars 161, 163, 164, 165, or 166 corresponding thereto, are adapted to energize solenoids which are similar to the solenoid 192 and which are adapted to release the triggers 201 of the various catapults 37 at the proper points in the processing station 12 in a similar manner so that the various oranges are discharged into the chutes which correspond to the classifications thereof.

The structure and operation of the catapults 37 may best be considered in connection with Figs. 5 and 6 wherein one of the catapults is shown on an enlarged scale. Each catapult 37 includes shafts 202 and 203 which are parallel to and are mounted on the chains 22 and 23, respectively, forming the conveyor 20 by means of suitable brackets 204, the latter being maintained in spaced relationship by transverse frame members 205. The catapult includes a generally U-shaped frame member 207 having arms 208 which are joined by a base section 209 and which extend transversely of the conveyor 20, the receptacle 35 being disposed between and suitably secured to the arms of the frame member. The free ends of the arms 208 are pivotally connected to the shaft 202 so that the frame member 207 and the receptacle 35 may rotate about the shaft 202 in the manner shown in Fig. 3 so as to catapult an orange from the receptacle.

The force required to rotate the frame member 207 and the receptacle 35 about the shaft 202 with sufficient velocity to catapult the orange at the desired speed is provided by a pair of springs 210 and 211 which encircle the shaft 202. The springs 210 and 211 are provided with arms 212 and 213, respectively, that engage the arms 208 of the U-shaped frame member 207, and are provided with additional arms 214 and 215, respectively, which engage the tranverse frame members 205 in such a manner that the springs may be placed in torsion by rotating the U-shaped frame member in the clockwise direction as viewed in Fig. 5. Thus, the catapult 37 may be "set" in the manner of a rat trap, and the energy stored in the springs 210 and 211 by twisting them when setting the catapults ejects the orange carried in the receptacle 35 when the catapult is released or "sprung."

The catapult 37 is retained in the operative or "set" position by the trigger 201 which, as previously discussed, is released by a solenoid whenever one of the bars 161 to 166 encounters the switch corresponding thereto. The trigger 201 is pivotally mounted on the shaft 203 and includes a pair of arms 218 having tapered heads 219 thereon which hook over the base portion 209 of the U-shaped frame member 207 to retain the catapult in the set position. The trigger 201 is urged in the clockwise direction, as viewed in Fig. 5, by a spring 220 which encircles the shaft 203 and which is similar to the springs 210 and 211. The spring 220 retains the trigger arms 218 in positive engagement with the base portion 209 of the U-shaped frame member 207, rotation of the trigger 201 in the clockwise direction, as viewed in Fig. 5, being limited by a suitable stop (not shown). This stop is so located that the base portion 209 of the frame member 207 may engage surfaces 223 on the tapered heads 219 at the ends of the arms 218 of the trigger 201 when the catapult 37 is being set so that heads are displaced out of the path of the base portion 209 until the catapult is set, whereupon the spring 220 automatically rotates the trigger so that the heads 219 hook over the base portion 209 to retain the catapult in the set position.

Thus, in order to set the catapult 37 after it has been sprung, it is merely necessary to rotate the U-shaped frame member 207 about the shaft 202 until the heads 219 on the trigger 201 hook over the base portion 209 of the frame member. As best shown in Figs. 1 and 2, the catapults 37 may be set by curved resetting members or bars 224 which engage the U-shaped frame members 207 thereof as the catapults approach the inspecting station 11. The curvature of the resetting bars 224 is such that the U-shaped frame members 207 of the various catapults 37 are gradually rotated in opposition to the springs 210 and 211 until the catapults are set in the manner described.

Resetting the catapults 37 on the point on the path of the conveyor 20 which is shown in the drawings permits the catapults to remain in their sprung positions until they have moved past the X-ray generator 40, thereby providing a clear path for the beam segments 46 to 49 as previously discussed.

As best shown in Fig. 5, each arm 208 of the U-shaped frame member 207 of each catapult 37 is pivotally connected to the corresponding shaft 203 by a pair of pivotally interconnected links 229 and 230. As best shown in Figs. 3 and 4, the links 229 and 230 limit the movement of the inoperative or sprung catapults 37 resulting from the action of the springs 210 and 211 (and from the action of gravity when the catapults are inverted in returning to the inspecting station 11) to keep the receptacles 35 from striking such components of the apparatus as the chutes 181 to 186.

In considering the operation of the inspecting and grading apparatus, only the conveyor 20 and the components of the apparatus which are associated therewith will be considered in detail since the conveyor 21 and its associated components operate in a similar manner.

In operation, the conveyor 20 is driven continuously at a uniform speed by a suitable motor through the medium of the belt 31. As each of the receptacles 35 on the conveyor 20 approaches the inspecting station 11, an orange or other object which is to be inspected and graded is deposited therein in any suitable manner. For example, the oranges may be deposited into the receptacles 35 on the conveyor 20 from a suitable chute (not shown) having means associated therewith for releasing the oranges in sequence at intervals which are dependent upon the speed of the conveyor and the spacing of the receptacles thereon.

As each orange on the conveyor 20 reaches the inspecting station 11, the corresponding projection 42 closes the switch 41 to energize the X-ray generator 40 for an interval sufficient to inspect the orange, whereupon the standard beam 46 is directed through the standard object 52 and is intercepted by the standard ionization chamber 56, and the test beam 48 is directed through the orange undergoing inspection and is intercepted by the test ionization chamber 58. Any difference between the resulting outputs of the two ionization chambers 56 and 58 is then evaluated with reference to the normal unbalance in the input circuit 66 of the amplifier 65, and the resulting unbalance, after amplification, is employed to energize an appropriate number of the thyratron tubes 91, etc., depending upon the juice content of the orange. The energized thyratron tubes then energize the corresponding solenoids 141, etc., so that the plungers 151, etc., act upon the corresponding bars 161, etc., of the recording device 160 adjacent the orange being inspected so as to record the grade or classification of the orange. Thus, the grade of each orange, which is indicated by the number of the bars 161, etc., of the corresponding recording device 160 which have been extended, is recorded for subsequent use on sorting the oranges.

The oranges and the respective recording devices 160 associated therewith are then moved into the processing zone 12 by the conveyor 20 until the topmost of the projecting bars 161, etc., of each recording device closes the switch 171, etc., corresponding thereto. As the various switches are closed in this manner, the corresponding solenoid-actuated levers 197 release the triggers 201 of the appropriate catapults 37 so that the oranges are discharged into the proper chutes 181, etc., corresponding to the previously determined classifications thereof.

The projecting bars of each recording device 160 are restored to their inoperative positions by the plate 170 as each recording device again approaches the inspecting station 11. The catapults 37 remain in their inoperative or sprung positions until they have passed the X-ray generator 40 so as to provide clear paths for the X-ray beams, and are subsequently reset by the bars 224 as they approach the inspecting station 11.

The apparatus described herein is capable of inspecting and grading oranges according to juice content at rates which are entirely satisfactory for commercial operations, and at a cost per orange which does not add appreciably to the total cost involved in preparing it for market. One of the principal factors responsible for the speed at which the apparatus disclosed is capable of processing oranges is the extremely small interval of time required for the automatic X-ray inspection system to inspect each orange and assign the proper classification thereto. For example, I have found that the time required to inspect and determine the grade of each orange is of the order of magnitude of 0.025 second.

Consequently, I am able to operate the conveyors 20 and 21 at relatively high speeds. For example, I have found that the apparatus disclosed will operate satisfactorily at conveyor speeds of the order of magnitude of sixty lineal feet per minute, and, since the space requirements of the catapults 37 are such that approximately three catapults may be employed per foot of conveyor length, it will be apparent that each of the conveyors 20 and 21 is capable of handling oranges at a rate in excess of 10,000 per hour. Since the output of oranges of a given size classification by the average packing plant is of the order of magnitude of 10,000 oranges per hour, it will be apparent that each of the conveyors 20 and 21 and the apparatus associated therewith are capable of inspecting and grading, according to juice content, the oranges of a given size classification.

The catapults 37 play an important part in enabling the apparatus to sort the oranges at rates of the order of magnitude mentioned. The electrically operated systems for releasing the catapults 37 require but a few hundredths of a second to trip the triggers 201 so that the catapults respond substantially instantaneously. Being self-propelled and movable with the conveyors 20 and 21, the catapults 37 are able to act on objects which are, in effect, stationary, and thus suffer none of the disadvantages common to ejecting devices which are located beside a conveyor and are required to act on moving objects. The catapults 37 accelerate the oranges from rest and thus there is little or no risk of damage thereto as compared to the case of an ejecting device which must strike the orange or other object a sharp blow in order to be effective. The chutes 181, etc., into which the oranges are ejected by the catapults 37 may be provided with snubbers or baffles (not shown) which decelerate the oranges slowly to prevent damage thereto. For example, one or more cloth curtains, or a cloth funnel may be located inside each of the chutes 181 to 186 to bring the oranges to rest gradually.

The springs 210 and 211 which actuate the catapults 37 are preferably adapted to accelerate the oranges to a speed which is several times that of the conveyors 20 and 21 so that the distances traveled by the oranges in the direction of motion of the conveyors during the catapulting operations are small, thereby increasing the accuracy of the catapults and permitting the use of relatively small chutes 181 to 186. I have found that if the oranges are accelerated to a speed of six feet per second for a conveyor speed of one foot per second, the chutes 181 to 186 need be only slightly larger than the oranges received thereby, thus providing a compact chute assembly. The springs 210 and 211 of the various catapults 37 are, of course, of uniform strength so that the action of all of the catapults will be uniform.

It will of course be understood that I do not intend to be limited to the foregoing performance characteristics of the apparatus disclosed herein. The characteristics discussed in the preceding paragraphs are intended as illustrative only and may be varied in accordance with varying conditions without departing from the spirit of the invention.

Although the method and apparatus which I have disclosed herein are directed to the inspecting and grading of oranges wherein the characteristic or property to be evaluated is the juice content of the oranges, it will be apparent that the specific method and apparatus disclosed may readily be employed for any inspecting and grading operations involving the determination of the state or condition of the internal structure of objects. Moreover, the fundamental principles involved may be applied to various other methods and apparatus wherein other characteristics of objects may be evaluated, and wherein the results of the inspection may be employed in performing other operations on the objects. Consequently, I do not desire to be limited to the specific disclosures contained herein, but desire to be afforded the protection offered by the full scope of my appended claims.

I claim as my invention:

1. In apparatus of the character described, the combination of: an endless conveyor adapted to transport an object; and a catapult on said conveyor and movable therewith for catapulting the object therefrom, said catapult having a receptacle thereon for the object.

2. In apparatus of the character described, the combination of: a conveyor; a catapult on said conveyor; a receptacle on said catapult; and means for releasing said catapult.

3. In an apparatus for grading objects according to a common internal characteristic thereof, the combination of: a structure providing spaced inspection and processing stations, said processing station including a plurality of sorting positions corresponding to various possible classifications of the objects according to said internal characteristic thereof; a conveyor carried by said structure for moving the objects in sequence through said inspection station to said processing station; means carried by said structure for driving said conveyor continuously at a substantially constant speed; X-ray inspecting means carried by said structure at said inspection station for evaluating said internal characteristic of each object and for assigning one of said classifications thereto; recording means carried by said conveyor adjacent each object so as to be movable therewith from said inspection station to said processing station for recording its classification; means actuable by said inspecting means for actuating said recording means in sequence; and sorting means actuable by said recording means for removing each object from said conveyor at the sorting position corresponding to its classification, said sorting means including means on said conveyor for accelerating said objects laterally of said conveyor to speeds exceeding that of said conveyor.

4. An apparatus as set forth in claim 3 wherein said X-ray inspecting means includes a standard object and means for comparing the X-ray opacities of the objects being graded to the X-ray opacity of said standard object.

5. An apparatus according to claim 3, wherein said sorting means includes catapults carried by said conveyor for projecting the objects laterally from said conveyor.

6. In an apparatus for grading objects according to a common characteristic thereof, the combination of: a structure providing an inspection station and providing a plurality of sorting positions corresponding to various possible classifications of the objects according to said characteristic thereof; a conveyor carried by said structure for moving the objects in sequence from said inspection station to said sorting positions; inspecting means carried by said structure at said inspection station for assigning classifications to the objects in sequence in accordance with said characteristic thereof; and sorting means controlled by said inspecting means for removing the objects from said conveyor at the sorting positions corresponding to the respective classifications thereof, said sorting means comprising catapults carried by said conveyor for projecting the respective objects upwardly and laterally from said conveyor.

7. An apparatus according to claim 6 wherein each of said catapults includes: an arm; means pivotally connecting one end of said arm to said conveyor for rotation about an axis substantially parallel to the path of said conveyor; a receptacle for one of the objects carried by said arm adjacent the opposite end thereof; and snap-action biasing means for swinging said arm about said axis.

8. An apparatus as defined in claim 7 wherein said snap-action biasing means includes a spring operatively connected to said arm.

9. In an apparatus for grading an object, the combination of: a conveyor; a catapult including a shaft carried by said conveyor and having an axis substantially parallel to the path of said conveyor, said catapult being rotatable about said axis, said catapult including a receptacle for the object and including snap-action biasing means for swinging said catapult about said axis; trigger means for restraining said catapult in opposition to the action of said biasing means; means for inspecting an object in said receptacle at a first station on said path; triggering means controlled by said inspecting means for actuating said trigger means at a second station on said path to release said catapult, whereupon said catapult projects the object laterally from said conveyor; and means actuable by said inspecting means for actuating said triggering means.

10. An apparatus as defined in claim 9 including means for re-engaging said trigger means and said catapult at a third station on said path.

11. In an apparatus for grading an object, the combination of: a conveyor; a catapult carried by said conveyor and rotatable about an axis substantially parallel to the path of said conveyor, said catapult including a receptacle for the object and including snap-action biasing means for swinging said catapult about said axis; trigger means for restraining said catapult in opposition to the action of said biasing means; means for inspecting an object in said receptacle at a first station on said path; recording means carried by said conveyor and actuable by said inspecting means; and triggering means actuable by said recording means for actuating said trigger means at a second station on said path to release said catapult, whereby said catapult projects the object laterally from said conveyor.

12. An apparatus as defined in claim 9 wherein said snap-action biasing means comprises a rat-trap spring encircling said shaft of said catapult and having one end operatively secured to said conveyor and its other end operatively secured to said catapult.

13. In an apparatus for grading objects, the combination of: a conveyor for moving the objects in sequence through an inspection station on the path of said conveyor to a sorting station thereon; means for inspecting the objects at said inspection station; means on said conveyor for recording the inspection of the objects comprising a plurality of groups of elements and means for pivotally mounting the elements of each group; means adjacent said conveyor for actuating said recording means including a plurality of devices for pivoting said pivoted elements of each group, respectively, and including means actuable by said inspecting means for actuating said devices; and means actuable by said recording means for sorting the objects at said sorting station.

14. In an apparatus of the character described, the combination of: means for forming an X-ray beam; and a conveyor having a pair of runs respectively intersecting said beam at a pair of spaced stations, said conveyor having interstices and having portions so located relative to said interstices that one of said interstices is always at one of said stations when one of said portions of said conveyor is at the other of said stations to avoid intercepting said beam at said one station.

15. In an apparatus of the character described, the combination of: a conveyor movable along a closed path; a plurality of receptacles on said conveyor and movable therewith along said path through first, second and third stations in that order, said receptacles being movable laterally out of said path; means for forming an X-ray beam intersecting said path at said first and third stations; and means for moving said receptacles laterally out of said path at said second station thereon during movement of said receptacles along said path from said first station toward said third station so that said receptacles do not intercept said beam when they arrive at said third station.

16. In an apparatus for grading objects according to a common internal characteristic thereof, the combination of: a structure providing spaced inspection and processing stations, said processing station including a plurality of sorting positions corresponding to various possible classifications of the objects according to said internal characteristic thereof; conveyor means carried by said structure for moving the objects in sequence through said inspection station to said processing station; means carried by said structure and operatively connected to said conveyor means for driving said conveyor means continuously at a substantially constant speed; a plurality of recording devices carried by said conveyor means so as to be movable therewith from said inspection station to said processing station, said recording devices being spaced apart along said conveyor means; substantially instantaneously operating means carried by said structure for evaluating said internal characteristic of each object, for assigning one of said classifications thereto, and for actuating one of said recording devices to record said assigned classification, said substantially instantaneously operating means including X-ray inspecting means, carried by said structure at said inspection station and positioned to direct an X-ray beam through each object at said inspection station, for evaluating said internal characteristic of each object and for assigning one of said classifications thereto, and including means operatively connected to and actuable by said X-ray inspecting means for actuating a corresponding one of said recording devices; and sorting means actuable by said recording devices for removing the objects from said conveyor means at the sorting positions corresponding to the respective classifications thereof.

17. An apparatus as set forth in claim 16 wherein said X-ray inspecting means includes a standard object, comparison circuit means for comparing the X-ray opacities of the objects being graded to the X-ray opacity of said standard object and for producing electrical biases corresponding to any differences between the X-ray opacities of the respective objects being graded and that of said standard object, and a plurality of thyratron tubes each adapted to fire at a different bias applied thereto, said means for actuating said recording devices including devices operatively connected to and energizable by said thyratron tubes, respectively.

18. An apparatus as defined in claim 16 wherein said sorting means includes a plurality of catapults spaced apart along said conveyor means and pivotally connected thereto for movement about axes substantially parallel to the direction of movement of said conveyor means and adapted to receive the respective objects being graded for projecting the objects laterally from said conveyor means.

19. An apparatus according to claim 18 wherein each catapult includes snap-action biasing means for pivoting it about its axis, said apparatus including a plurality of trigger means on said conveyor means for restraining said catapults, respectively, in opposition to the action of said biasing means, said trigger means being engageable and actuable by said recording devices.

20. An apparatus as defined in claim 16 wherein said conveyor means includes a pair of spaced, substantially parallel conveyors each adapted to convey a plurality of objects in sequence, said X-ray inspecting means including a single X-ray generator and collimating means for directing radiation from said X-ray generator in the form of beams respectively intersecting the paths of said conveyors.

21. In an apparatus for grading a test object according to an internal characteristic thereof, the combination of: a standard object; X-ray generating means for directing beams of X-rays through the test object and said standard object, respectively; comparison circuit means responsive to X-radiation transmitted by the test object and said standard object for producing an electrical bias corresponding to any difference between the X-ray opacities of the test object and said standard object; a plurality of thyratron tubes; biasing means for applying a progressively decreasing negative bias to said thyratron tubes, said biasing means being connected to said comparison circuit means to cause said electrical bias to oppose the negative bias applied to said thyratron tubes by said biasing means, whereby a number of said thyratron tubes dependent upon the magnitude of said electrical bias are caused to fire; recording means; and devices operatively connected to and actuable by said thyratron tubes, respectively, for actuating said recording means.

References Cited in the file of this patent

UNITED STATES PATENTS

| Number | Name | Date |
| --- | --- | --- |
| 261,918 | Frye | Aug. 1, 1882 |
| 1,325,909 | Price | Dec. 23, 1919 |
| 1,396,221 | Ladd | Nov. 8, 1921 |
| 1,498,198 | Philips | June 17, 1924 |
| 1,626,359 | Rundell | Apr. 26, 1927 |
| 1,960,231 | Cooper | May 29, 1934 |
| 2,140,355 | Gulliksen | Dec. 13, 1938 |
| 2,175,262 | Haugh | Oct. 10, 1939 |
| 2,175,617 | Rick | Oct. 10, 1939 |
| 2,179,859 | Page | Nov. 14, 1939 |
| 2,183,606 | Day | Dec. 19, 1939 |
| 2,186,196 | Haugh | Jan. 9, 1940 |
| 2,312,357 | Odquist | Mar. 2, 1943 |
| 2,344,596 | Carmina | Mar. 21, 1944 |
| 2,505,283 | Fenton | Apr. 25, 1950 |

FOREIGN PATENTS

| Number | Country | Date |
| --- | --- | --- |
| 293,240 | Germany | July 27, 1916 |
| 30,371 | France | Feb. 2, 1926 |
| | (Addition to 601,545) | |